(12) United States Patent
Chappell

(10) Patent No.: US 12,479,167 B2
(45) Date of Patent: Nov. 25, 2025

(54) POLYMERIC PIPE WELDING APPARATUS

(71) Applicant: PINWELD LIMITED, Calne (GB)

(72) Inventor: Keven Chappell, Calne (GB)

(73) Assignee: PINWELD LIMITED, Calne (GB)

( * ) Notice: Subject to any disclaimer, the term of this patent is extended or adjusted under 35 U.S.C. 154(b) by 163 days.

(21) Appl. No.: 18/571,788

(22) PCT Filed: Jun. 20, 2022

(86) PCT No.: PCT/GB2022/051563
§ 371 (c)(1),
(2) Date: Dec. 19, 2023

(87) PCT Pub. No.: WO2022/269238
PCT Pub. Date: Dec. 29, 2022

(65) Prior Publication Data
US 2024/0278509 A1 Aug. 22, 2024

(30) Foreign Application Priority Data

Jun. 22, 2021 (GB) ...................................... 2108962

(51) Int. Cl.
*B29C 65/20* (2006.01)
*B29C 65/00* (2006.01)
(Continued)

(52) U.S. Cl.
CPC ............ *B29C 66/652* (2013.01); *B29C 65/20* (2013.01); *B29C 65/7841* (2013.01);
(Continued)

(58) Field of Classification Search
CPC . B29C 65/20; B29C 65/2007; B29C 65/7841; B29C 66/1142; B29C 66/5221;
(Continued)

(56) References Cited

U.S. PATENT DOCUMENTS 6,299,050 B1 10/2001 Okamura et al.
12,220,878 B2 * 2/2025 Wüst ................... B29C 65/7802
(Continued)

FOREIGN PATENT DOCUMENTS

DE 19631810 A1 2/1998
EP 1529624 A1 5/2005
(Continued)

*Primary Examiner* — James D Sells
(74) *Attorney, Agent, or Firm* — DINSMORE & SHOHL LLP

(57) ABSTRACT

An apparatus for welding polymeric pipes such as pipe segments in a pipeline welds first and second pipes around a circumferential weld zone and has one or more welding heads, a carriage for guiding the one or more welding heads around the circumferential weld zone and a drive arrangement for effecting relative rotation between the pipes and the or each welding head. The or each of the welding heads has a body and a heating element carried by the body for supplying heat to the circumferential weld zone to cause melting thereof. The heating element is arranged to reciprocate relative to the body of the welding head between a retracted and an extended configuration such that as the heating element moves from the retracted to the extended configuration the heating element melts and penetrates the surface of the circumferential weld zone forming a weld.

17 Claims, 4 Drawing Sheets

(51) Int. Cl.
    *B29C 65/78*         (2006.01)
    *B29L 23/00*         (2006.01)

(52) U.S. Cl.
    CPC ...... *B29C 66/1142* (2013.01); *B29C 66/5221* (2013.01); *B29C 66/612* (2013.01); *B29C 66/73921* (2013.01); *B29C 66/836* (2013.01); *B29C 66/86531* (2013.01); *B29C 66/91* (2013.01); *B29C 66/93* (2013.01); *B29C 66/95* (2013.01); *B29L 2023/22* (2013.01)

(58) Field of Classification Search
    CPC ............ B29C 66/612; B29C 66/73921; B29C 66/836; B29C 66/91; B29C 66/93; B29C 66/95
    USPC ........................................................ 156/296
    See application file for complete search history.

(56) References Cited

U.S. PATENT DOCUMENTS

| | | |
|---|---|---|
| 2002/0027155 A1 | 3/2002 | Okamura |
| 2004/0050906 A1 | 3/2004 | Rice et al. |
| 2017/0361538 A1 | 12/2017 | Hasific |
| 2020/0088688 A1 | 3/2020 | Crosswell |

FOREIGN PATENT DOCUMENTS

| | | |
|---|---|---|
| EP | 2255918 A1 | 1/2010 |
| GB | 1365216 A | 8/1974 |
| WO | 199310935 A1 | 6/1993 |
| WO | 199638256 A1 | 12/1996 |
| WO | 9939861 A1 | 8/1999 |
| WO | 2002102575 A1 | 6/2001 |
| WO | 2019092444 A1 | 5/2019 |

\* cited by examiner

POLYMERIC PIPE WELDING APPARATUS

CROSS-REFERENCE TO RELATED APPLICATIONS

This application is the U.S. National Stage of PCT/GB2022/051563 filed on Jun. 20, 2022, which claims priority to United Kingdom Patent Application 2108962.8 filed on Jun. 22, 2021, the entire content of both are incorporated herein by reference in their entirety.

FIELD OF THE INVENTION

This invention relates to an apparatus for welding polymeric pipes such as pipe segments in a pipeline.

BACKGROUND OF THE INVENTION

Pipeline systems can include long stretches of pipe sections or segments comprising and may comprise metal or plastic materials and are used to transport fluids such as water, oil, and natural gas between two locations. Construction of pipeline systems typically involves connection of pipe segments of suitable diameter and lengthwise dimensions together via weld joints, for example, capable of providing a liquid tight seal for the connected pipe segments.

Joining pipe segments with metal pipes is well known, and during formation of a weld joint between the two pipe segments, an end of one pipe section or segment is brought into close proximity or contact with an end of a second pipe section or segment. The pipe segments are held in relation to each other and a weld joint is formed to connect the two ends of the pipe segments using a suitable welding process. After the weld is complete and cleaned, the weld may be inspected and optionally coated with a protective coating.

In many applications polymeric pipes could be utilised in place of metal pipes, having properties suitable for harsh environments. A problem however exists in that the joints between two adjacent pipe segments is a source of potential weakness to the integrity of the pipe. The Butt fusion technique uses a simple heated plate placed between the ends of the pipe segments to be welded and pressure is applied "melting" the surfaces. The plate is then removed, and the heated pipe surfaces are then pressed and held together. This technique also has drawbacks. The speed, temperature and pressure of operation are critical and not always achieved. Correct warmup and cool down times are imperative parameters and ones that are often missed by operators. Some cool down times can approach an hour on large bore pipes. The Butt fusion technique is also highly susceptible to environmental issues including water, wind and contamination as the welding is likely to be performed on location in a potentially harsh environment. Any unseen moisture can cool the weld face causing instant failure to weld. This moisture, if present inside the pipe segments, can also generate steam and the gas can cause porosity of the joint.

For these reasons mechanical fastenings are often utilised comprising clamps and seals to increase the integrity of the joint. Mechanical fixings are, however, expensive to manufacture and the ends of the pipe segments also require forming with the provision for example of circumferential grooves. Mechanical fixings are also susceptible to leakage due to seal failure and are time consuming to fit correctly and are therefore sparingly used, particularly for difficult to access locations.

SUMMARY OF THE INVENTION

The present invention aims to address the above-mentioned drawbacks associated with joining polymer pipe sections, or at least provide a useful alternative.

According to an aspect of the present invention there is a pipe welding apparatus for welding first and second polymeric pipes in an end to end configuration around a circumferential weld zone defined by the end portions of the first and second polymeric pipes, the pipe welding apparatus comprising:
  one or more welding heads;
  a carriage for guiding the one or more welding heads around the circumferential weld zone;
  a drive arrangement for effecting relative rotation between the pipes and the or each welding head;
  wherein the or each of the welding heads comprises a body and a heating element carried by the body for supplying heat to the circumferential weld zone to cause melting of the circumferential weld zone, wherein the heating element is arranged to reciprocate relative to the body between a retracted and an extended configuration, such that as the heating element moves from the retracted to the extended configuration the heating element melts and penetrates the surface of the circumferential weld zone forming a weld.

It will be understood that the circumferential weld zone preferably incorporates the interface between the first and second pipes.

The claimed invention therefore provides a welding apparatus capable of quickly and effectively welding polymeric pipes in an end to end configuration.

It will be appreciated that there is no requirement to provide a filler material.

The body preferably further comprises a trailing contact surface trailing the heating element along the circumferential weld zone arranged to constrain molten polymeric material in the circumferential weld zone, where the heating element is also arranged to reciprocate relative to the trailing contact surface.

The drive arrangement is preferably arranged to drive the or each welding head and further preferably the carriage circumferentially around the circumferential weld zone. Whilst the pipes can in some circumstances be rotated relative to a fixed carriage, it is generally easier for many applications that the or each heating element carriage moves relative to the pipes. The welding head(s) and the carriage are preferably coupled such that as the carriage moves circumferentially around the weld zone the welding head(s) also moves around the weld zone. It will however be appreciated that the welding head(s) may move relative to the carriage. The welding head(s) may be guided by the carriage.

The carriage preferably extends to form a loop for extending around the circumference of the polymeric pipes to be welded, and preferably extends circumferentially around the entirety of the circumferential weld zone.

The apparatus beneficially comprises a housing for housing the one or more welding heads and carriage. The housing acts to control the immediate vicinity of joint thus creating beneficial environmental conditions for optimising the weld quality.

The pipe welding apparatus preferably further comprises a controller for controlling one or more operational parameters of the apparatus. The operational parameters may comprise one or more of the temperature of the heating element, the depth of penetration of the heating element into the weld zone, the speed of movement of the heating element, the speed of relative rotation between the pipes and the heating element(s), the angular orientation of the heating element relative to the body and/or the lateral alignment of the one or more welding heads relative to the weld zone. Active lateral alignment is beneficial as ensures that the heating element is aligned to beneficially cause melting of both abutting ends of adjacent pipes.

The pipe welding apparatus preferably further comprises a measurement device for measurement of a characteristic of the circumferential weld zone, and preferably wherein the controller is arranged to control the one or more operational parameters dependent upon the measured characteristic. The measured characteristic (for example relating to weld quality) may be output to a user. Alternatively there may be automated feedback to the controller to modify or optimise operational parameters based on this feedback.

The measurement device is preferably carried by the carriage. The measurement device is a non-destructive measurement device. The measurement device may comprise one or more ultrasonic transducers. For lateral alignment of the welding head(s) relative to the weld zone it is beneficial if a measurement device is positioned in advance of the welding head so that the welding head is accurately aligned with the interface of the pipes. Accordingly, the measurement device leads the welding head in the direction of welding. The measurement device may therefore be in close proximity to the welding head. Both are beneficially carried by the carriage. It will therefore be appreciated that the characteristic of the weld zone measured is in an area of the weld zone that has not been welded. Use of a measurement device in this way however means that the characteristics of the weld zone trailing the welding head (and thus in a welded area) are not measured until almost a full rotation of the carriage relative to the pipes. As such in some embodiments a second measurement device may be provided coupled to the carrier intermediate the first measurement device and a trailing edge of the welding head.

The controller preferably diagnoses the measured characteristic and based on this diagnosis controls one or more operational parameters. The control may be an adjustment to one or more operational parameters.

The pipe welding apparatus preferably comprises a first and second welding head positioned at substantially diametrically opposite locations of the carriage. This aids in stability of the pipe welding apparatus in operation by reducing vibration.

Relative rotation between the pipes and the carriage is preferably achieved through the carriage comprising a plurality of wheels linked together by a plurality of linkages. Thus, the drive arrangement preferably drives the carriage circumferentially around the pipes such that the heating element(s) can apply heat to the circumferential weld zone.

The one or more welding heads are preferably coupled to the carriage. The one or more measurement devices are also preferably coupled to the carriage.

The orientation of the heating element relative to the body is preferably adjustable. This means that the angle at which the heating element contacts the weld zone can be controlled. This may be adjusted by the controller automatically. The angle can be adjusted depending on for example the thickness of the polymeric pipes to be welded.

An important feature of the present invention is the ability to modify the depth of penetration (or stroke) of the heating element. This is particularly important when approaching the full rotation of the weld zone as simply stopping action of the reciprocating heating element may lead to leakages in the weld zone. Accordingly, the ability to reduce the stroke of the heating element once the entire circumference of the pipes has been welded means that a small degree of 'overweld' is possible with reducing stroke length ensuring a high-quality weld. Accordingly, the apparatus may be configured to perform a weld around the entire circumference of the weld zone with the heating element extending by a first distance (where the distance is the stroke) to the extended configuration, and overweld a portion of the weld by performing one or more additional cycles of heat element reciprocation whereby the heating element extends to a second distance in the extended configuration which is less than the first distance. The stroke is preferably reduced for each subsequent reciprocation cycle. This can be achieved for example by the controller being configured to differentiate (preferably based on an output from the measurement device) between a welded and a non-welded portion of the weld zone, and if a welded portion is determined the subsequent depths of penetration are reduced incrementally.

The heating element preferably comprises a proximal end for cooperating with a body of a welding head extending forwardly to a distal end, the distal end having a first end face defining a first penetrating surface and the heating element further comprising a projection extending longitudinally forwards from the first penetrating surface to a second end face defining a second penetrating surface.

The pipe welding apparatus may further comprise a capping arrangement for depositing a capping material onto the weld. The capping arrangement is also preferably further carrier by the carriage. Accordingly, the capping arrangement moves with the carriage. In an embodiment the carriage carries the welding head, measurement device and capping arrangement, and the apparatus is therefore capable of performing all three operations in a relative rotation of the pipe and carriage. It may be possible that all three tasks are completed in a single rotation thereby providing an extremely fast welding technique. The capping may be for identification purposes.

It will be appreciated that the pipe welding apparatus may be utilised for welding from external of the pipe or inside the pipe. In some circumstances it may be beneficial to weld from both external and internal the pipe. This may be performed simultaneously or at different times. It may be beneficial to provide a second carriage, second one or more welding heads and a second drive arrangement such that the circumferential joint can be welded from a location both inside and outside the joint.

Also according to the present invention there is a method of welding first and second polymeric pipes in an end to end configuration around a circumferential weld zone, the method comprising guiding one or more weld heads around the circumferential weld zone, the or each welding head comprising a body and a heating element carried by the body for supplying heat to the circumferential weld zone to cause melting of the weld zone, and reciprocating the heating element such that as the heating element moves from the retracted to the extended configuration the heating element melts and penetrates the surface of the circumferential weld zone forming a weld.

According to a second aspect of the invention there is a heating element of beneficial use in the pipe welding apparatus of the present invention. It has been determined that in the event that the reciprocating heating element pierces the inner surface of the abutting pipes and pushes flowing polymer material into the bore, an uneven inner surface may result providing an obstruction to flow through the pipes and also causing a potential weakness in the pipe weld. Furthermore, the uneven nature of the inner surface provides recesses suitable for catching material carried by the liquid flowing through the pipes leading to a potential quality issue with the liquid. A technique for minimising this problem is to weld through the majority of the thickness of the pipe wall but terminate the weld just before the heating element pushes flowing polymer into the bore. This still leaves a small unwelded gap between part of the thicknesses of the abutting pipes which can affect flow, and further means that the weld is not through the entire thickness thereby providing a potential weakness in the weld. This is, therefore, also unsatisfactory.

For the reasons identified above it is beneficial to minimise any irregularity caused by the welding process on the inner surface, but at the same time ensure weld integrity by welding through the entire pipe thickness.

According to a further aspect of the present invention there is a heating element for a welding head for welding polymeric materials where the heating element is configured for melting and penetrating the surface of a polymeric material, the heating element comprising a proximal end for cooperating with a body of a welding head extending forwardly to a distal end, the distal end having a first end face defining a first penetrating surface and the heating element further comprising a projection extending longitudinally forwards from the first end face to a second end face defining a second penetrating surface.

The second end face is preferably substantially planar, where the plane of the second end face is substantially perpendicular to the longitudinal length of the projection.

The heating element comprises a cross sectional width and height profile, where the first end face preferably extends outwardly widthwise from both sides of the projection.

The first end face of the heating element also preferably extends outwardly heightwise from both sides of the projection.

The area defined by the first end face is preferably greater than the area defined by the second end face.

BRIEF DESCRIPTION OF THE DRAWINGS

Aspects of the present invention will now be described by way of illustration only with reference to the accompanying Figures, where.

DETAILED DESCRIPTION OF THE INVENTION

Figure 1:
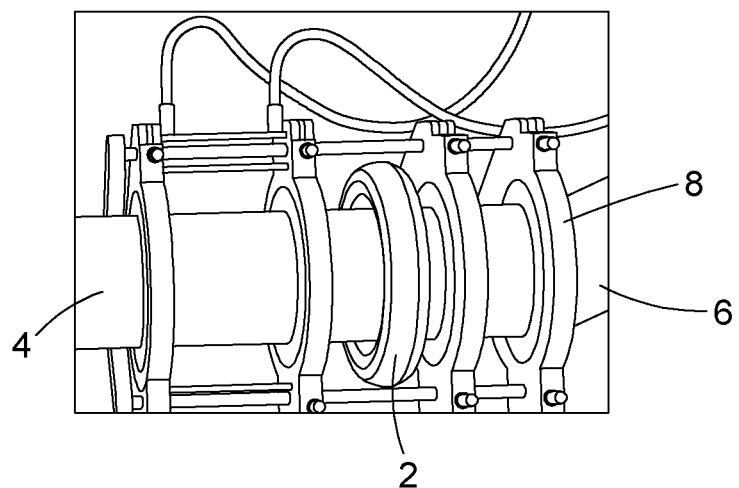
FIG. 1 is a schematic representation of an aspect of the present invention being used in welding polymeric pipes together.

Referring to FIG. 1 there is a schematic representation of an illustrative embodiment of a pipe welding apparatus 2. The pipe welding apparatus 2 is positioned around the joint between two abutting pipes 4,6. A mounting system 8 is typically utilised to hold the pipes 4,6 in alignment and may apply a face pressure between the abutting pipes if required for weld quality purposes. Such mounting systems 8 are well known and may also include means to prepare the abutting faces to be welded again to maximise welded joint quality.

Figure 2:
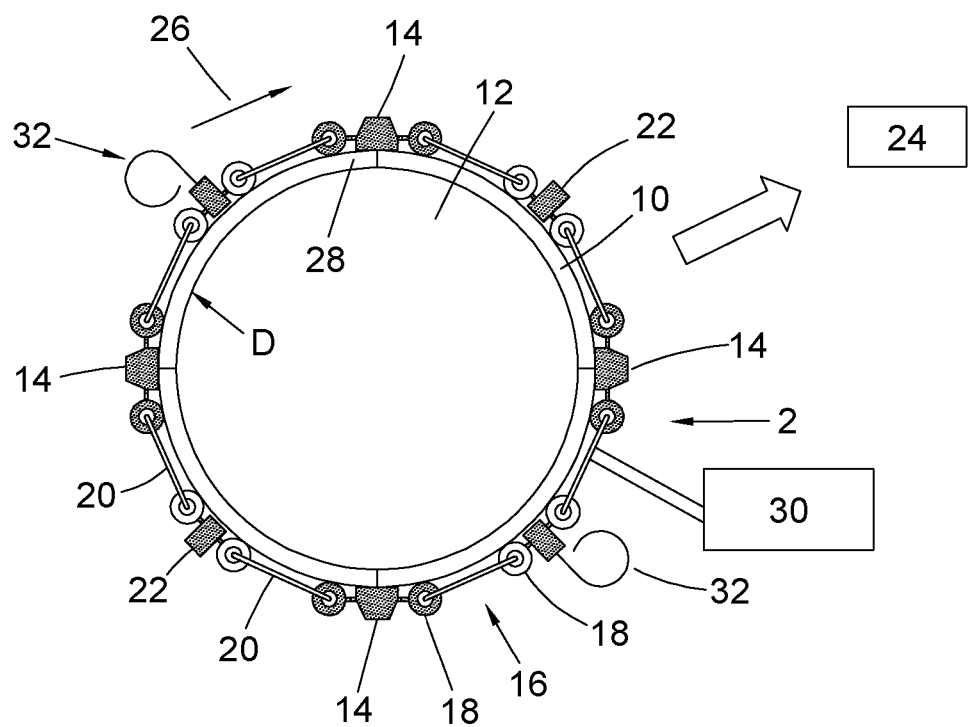
FIG. 2 is a schematic representation of a cross sectional representation of an aspect of the present invention.

Referring now to FIG. 2 there is a schematic representation of an illustrative embodiment of the present invention viewed in cross section. Accordingly represented is a cross section of the joint 10 between the two abutting pipes defining the cavity 12 within the pipes 4,6. The pipe welding apparatus 2 is presented in schematic form without any housing as present in FIG. 1. The pipe welding apparatus 2 in the illustrative embodiment comprises four individual welding heads 14. By diametrically opposing (multiple) pairs of welding heads 14 accuracy of the welding process is increased as there is a lesser requirement to modify the pipe welding apparatus to compensate for the penetrative forces associated with the welding head 14 and vibrations that may occur. An illustrative welding head 14 is presented in FIG. 3. Referring further to FIG. 2, the welding heads 14 are carried by a carriage 16 which is arranged to guide the weld heads 14 relative to the pipes 4,6 to be welded. The carriage 16 may take various forms such as a wheeled carriage as presented in FIG. 2 showing multiple wheels 18 engaged to one another and the welding heads via multiple linkages 20. Other forms of the carriage 16 may comprise a sliding rail or pre-aligned channel system, however whatever form is used must enable relative rotation of the carriage 16 with respect to the pipes 4,6. For most applications the carriage 16 will rotate around the circumference of the pipes 4,6, although it is also possible to rotate the pipes whilst keeping the carrier stationary. The carriage is aligned such that the welding heads 14 are closely aligned with the abutting end faces of the respective pipes. This means that the weld zone incorporates both the interface of the pipes and also overlaps into the ends of each of the pipes 4,6 thereby increasing the quality of the weld.

The pipe welding apparatus further comprises a measurement device (or in the case of the illustrative embodiment two measurement devices) 22 for measurement of a characteristic of the circumferential weld zone which is also carried by the carriage 16. The pipe welding apparatus further comprises a controller 24 arranged to control one or more operational parameters dependent upon the measured characteristic. The measured characteristic depends on the measurement device utilised. The measurement device is a non-destructive measurement device and in the illustrative embodiment comprises an ultrasonic transducer commonly used for non-destructive weld testing. The measurement device provides significant advantages and may be used both for measurement of the weld zone that has been welded and also measurement of the weld zone that at that moment has not been welded. Outputs from the measurement device relating to both locations can be used to control operational parameters of the pipe welding apparatus.

For lateral alignment of the welding head(s) relative to the weld zone it is beneficial if a measurement device 22 is positioned in advance of the welding head (in relatively close proximity to the welding head) so that the output from the measurement device is transmitted to the controller 24 to control alignment of the welding head with the interface of the pipes. This configuration is shown in FIG. 2 where the direction of rotation of the carrier 16 is indicated by arrow 26 and there is a measurement device 22 positioned in front of the as shown uppermost welding head 14. Accordingly, a signal is transmitted to the controller 24 from the measurement device 22 at regular time intervals and the lateral alignment of the weld head 14 is modified so that the heating element 28 of the welding head 14 is aligned with the interface of the first and second pipe 4,6. It may also be desirable to adjust other operational parameters based on a measurement device 22 leading the weld head 14. For example, if variations in pipe thickness are identified then the heat supplied or the stroke of the reciprocating heating element 28 may be accordingly modified and optimised.

It is further beneficial that welded portions of the weld zone also undergo measurement by the measurement device to determine the quality of the weld. Signals representing weld quality can be output to the controller and the output recorded. In the event of the weld not fulfilling requirements for quality, then the controller can output this information to a user and/or reweld either the entire weld zone or that specific part of the weld which does not meet satisfactory requirements. Accordingly, in such a configuration there must be a measurement device 22 trailing the weld head 14. If no weld deficiencies are identified, then the weld can be assigned a unique identification number for recording purposes.

In terms of the operational parameters that may be modified, there are multiple possible parameters that can be modified. These include one or more of temperature of the heating element, the depth of penetration of the heating element into the weld zone, the speed of movement of the heating element, the speed of relative rotation between the pipes and the heating element(s), the angular orientation of the heating element relative to the body and/or the lateral alignment of the one or more welding heads relative to the weld zone.

The pipe welding apparatus further comprises a drive arrangement 30 for effecting relative rotation between the pipes and the or each welding head. As described, the drive arrangement causes rotation of the carrier 16 relative to the pipes 4,6.

A further feature of the illustrative embodiment of the invention is the provision of a capping arrangement 32 for depositing a capping material onto the weld. The capping material is deposited (by extrusion for example) after the weld has been made by the weld head 14 and after the weld has been checked using the measurement device 22 and the controller 24. The capping material may be a polymer and identifies that the weld has been completed and checked for quality purposes. For example, the capping material may be a polymer having a different colour to the colour of the pipes 4,6. It is possible to incorporate a strain gauge into the capping material for enabling monitoring for potential failure from a remote location.

It will be appreciated that the illustrative embodiment of FIG. 2 shows the pipe welding apparatus 2 external of the pipes, however the pipe welding apparatus may alternatively (or in addition) be positioned inside the pipes 4,6. Furthermore, different configurations of one or more of welding heads 14, measurement devices 22 and capping arrangements 32 may be provided depending on particular requirements such as pipe diameter etc.

Figure 3:
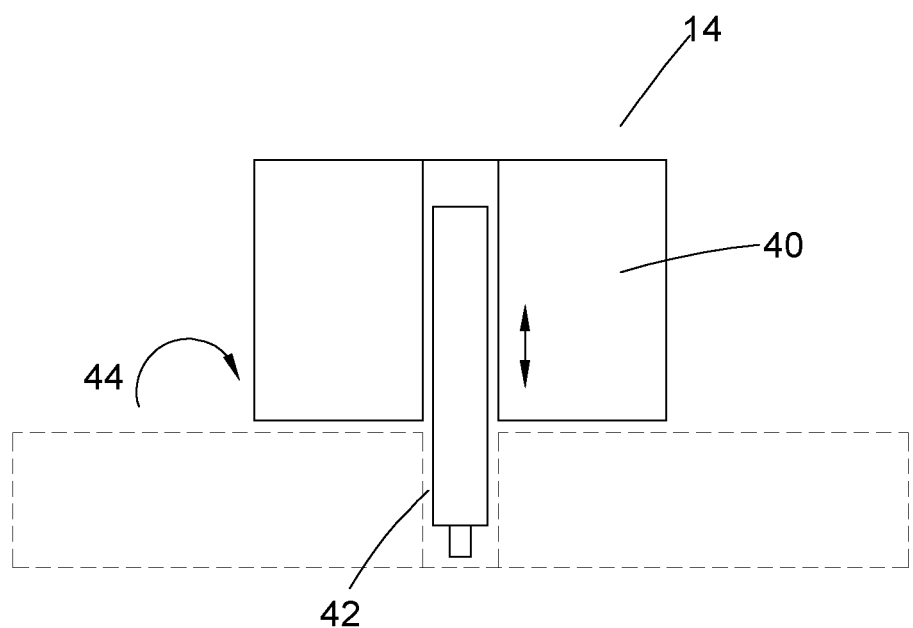
FIG. 3 is a schematic representation of a partial welding head according to an illustrative embodiment of the present invention.

Referring now to FIG. 3 there is a schematic longitudinal view through a weld head 14 and a wall of pipes 4,6 to be welded. The welding head 14 comprises a body 40 and heating element 28 carried by the body 40. The heating element supplies heat to the circumferential weld zone 42 to cause melting of the end portions of the first and second pipes 4,6. The heating element 28 is arranged to reciprocate relative to the body 40 as indicated between a retracted and an extended (as shown) configuration, such that as the element moves from the retracted to the extended configuration the heating element melts and penetrates the surface of the end portions of the first and second pipes forming a weld. The body 40 further comprises a trailing contact surface 44 (hidden behind the body 40 as the welding head 14 is moving out of the page in FIG. 3) trailing the heating element along the circumferential weld zone arranged to constrain molten polymeric material in the weld zone, where the heating element is also arranged to reciprocate relative to the trailing contact surface 44. Operational parameters of the welding head 14 are controlled by the controller 24.

Figure 4:
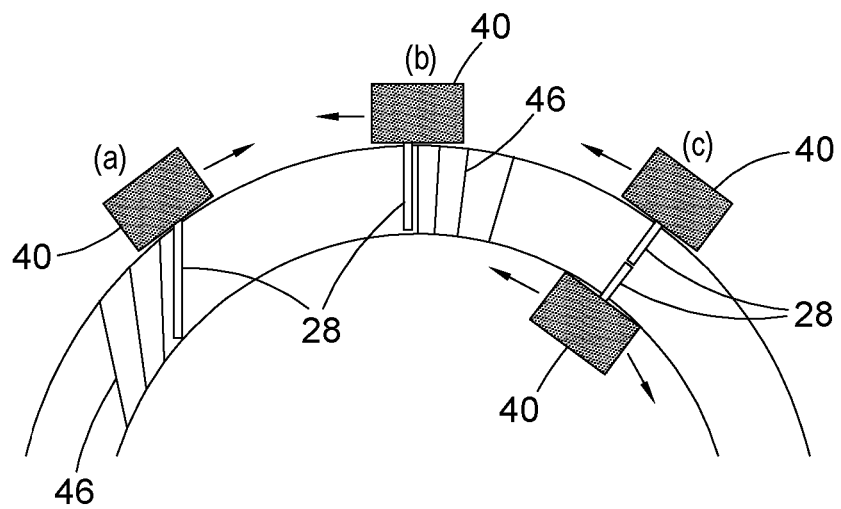
FIG. 4 is a schematic representation of three different options for using the welding heads according to illustrative embodiments of the present invention.

Referring now to FIG. 4a-c, there is a schematic cross section through the weld zone of two abutting pipes 4,6 illustrating three different welding head 14 configurations in operation. The angle of the heating element 28 may be adjustable relative to the body 40, resulting in variations in the angle of weld as shown in FIGS. 4a and 4b. In FIG. 4a, the angle of the heating element 42 is extreme relative to the body 40, approaching tangential. Arrows in each Figure indicate the direction of travel of the welding head 14, and the lines 46 represent the direction that the heating element 28 has taken through the weld zone of the pipes. In FIG. 4c, there are two pipe welding apparatus' shown, and in such a configuration multiple apparatus' may be used where the diameter of pipe is sufficient to receive the apparatus into the bore and where the thickness of the pipe wall requires welding from both directions. Opposing heating elements may comprise different tip profiles to provide cooperating displacement of flowable polymer in operation.

Figure 5:
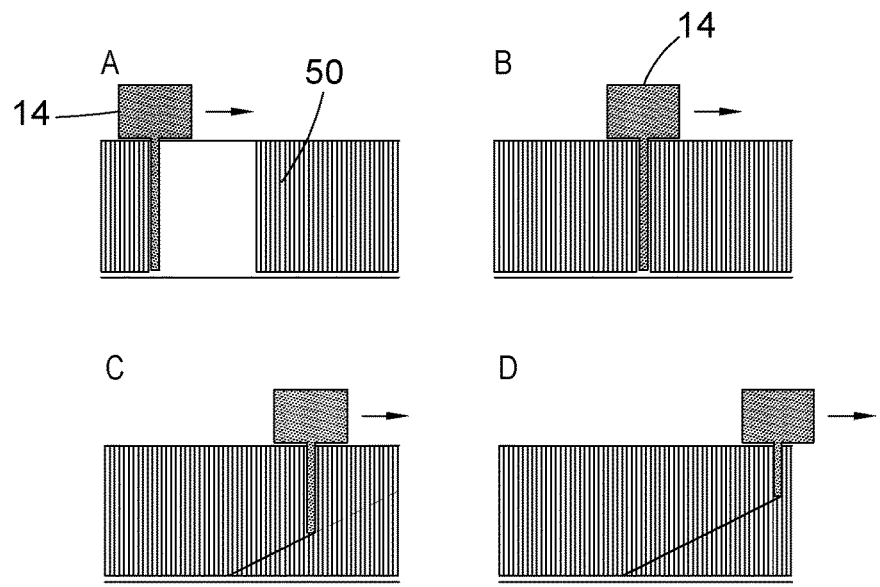
FIG. 5 is a schematic representation of the progress of the apparatus according to an illustrative embodiment as welding of a pipe is completed.

Reference is now made to FIG. 5. As described above a single welding head 14 (and its accompanying modular accessories such as measurement device 22 and/or capping arrangement 32) is capable of welding the total circumference of the pipes 4,6; however the number of unit modules may be varied to suit the size of application. Larger numbers of welding heads 14 permit large pipe diameters to be welded and tested in similar timescales to those of a small diameter. When nearing the full rotation of the circumference (or start point) the apparatus cannot just stop welding the pipes 4,6 as this would potentially lead to leaks and reductions in strength of the weld joint. This is accommodated by the process as presented in FIG. 5. This apparatus employs a reducing stroke facility capability of the heating element 28 which allows the stroke to be sequentially reduced as the welding head 14 begins to pass over from a non-welded portion of the weld zone to a welded portion of the weld zone. This is shown in FIG. 5a-d which shows the welding head 14 approaching the weld zone that has already been welded 50. The controller 24 knows that the welded portion 50 has been reached from outputs from the measurement device 22, and therefore moving from FIGS. 5b-d the depth of penetration (stroke) of the heating element 28 is incrementally reduced.

In practice, this has the effect of allowing the apparatus (particularly the heating element 28) to systematically withdraw itself from the polymer material (of any depth) without compromising the weld and hence the joint quality. It is this feature of the ability to modify the weld depth that also allows the system to "reweld" areas picked up by the sensor array as potential defects while the apparatus is still in place, hence offering the user the ability to self-certify a joint as being optimally welded. The measurement device 22 may comprise a sensor array, and may include one or more of void detection, temperature and pressure sensors and vibration assessment. These are controlled by the controller 24 and allow the system to continually adjust against known parameters to ensure welded joint optimisation. This information is displayed for the operator and recorded with environmental and positional data for use in record keeping and compliance activities.

Figure 6:
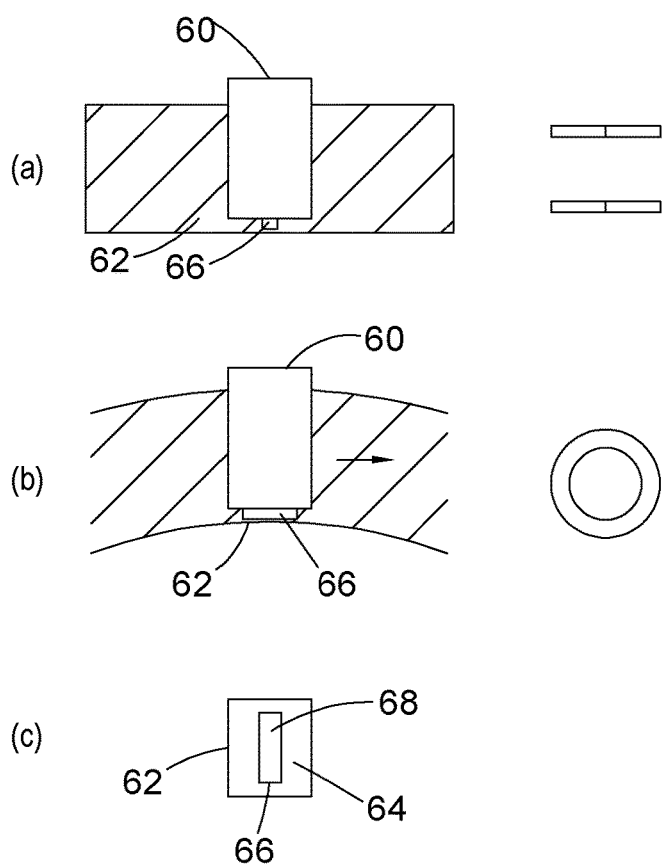
FIG. 6 is a schematic representation of a heating element according to an illustrative embodiment of the present invention.

Referring to FIG. 6*a-c*, there is a longitudinal cross section of pipes 4,6 and heating element 28 (FIG. 6*a*), a transverse cross sectional view through the interface of the joint as shown in FIG. 6*b*, and in FIG. 6*c* is an end on view of an illustrative embodiment of a heating element 28.

As described above, it is important in many applications that the inner surface defining the bore of the pipes is substantially free from indents or fissures where detritus may collect leading to potential quality issues for transportation of water for example. The heating element 28 according to an illustrative embodiment has been designed with this in mind.

The heating element 28 comprises a proximal end 60 for cooperating with a body of a welding head extending forwardly to a distal end 62, the distal end 62 having a first end face 64 defining a first penetrating surface. This penetrating surface acts to heat and push the majority of the flowable polymeric material to form the weld. A projection 66 extends longitudinally forwards from the first end face 64 to a second end face 68 defining a second penetrating surface.

The first end face is substantially planar, and the plane of the first end face is substantially perpendicular to the longitudinal length of the projection. The second end face is substantially planar and the plane of the second end face is substantially perpendicular to the longitudinal length of the projection. It will however be appreciated that alternative configurations are possible to optimise use for particular polymers/depths etc. For example the first end face may taper toward the projection 66. It will however be appreciated that the cross-sectional area of the projection is less than the cross sectional area of the body of the heating element extending to the first end face.

As shown in FIG. 6*c* the cross section of the heating element has a width and a depth profile. In this embodiment, the width and depth of the main body of the heating element 28 are similar dimensions. The projection may have a smaller width than depth as shown. Further in this embodiment the first end face extends widthwise and depthwise in both directions beyond the extremities of the projection. It will however also be appreciated that the projection may for example extend from the first face such that there is no first end face on one or two sides of the projection. This is apparent in the embodiment shown in FIG. 7, which shows the action of a heating element having a projection with first and second end faces.

Figure 7A:
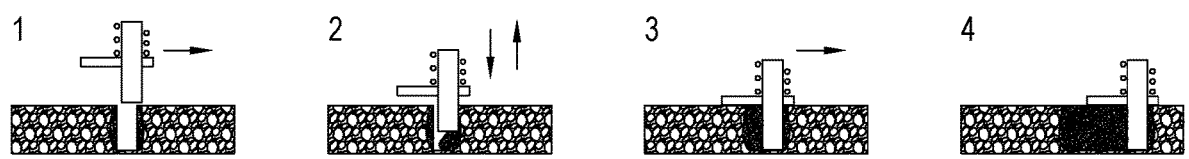
FIG. 7 is a schematic representation of a comparison between a welding operation utilising a first head configuration in FIG. 7a and a second head configuration in FIG. 7b.
Figure 7B:
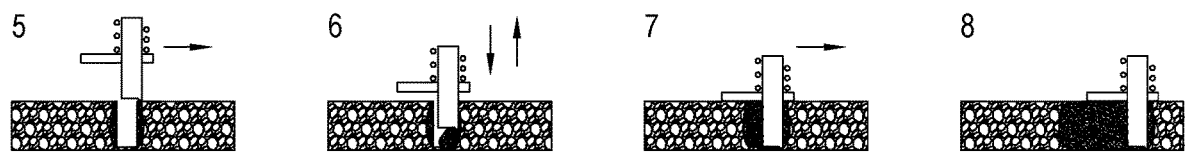

Referring to FIG. 7*a*, images 1-4 show operation of a welding head 14 without a projection 66. In this embodiment the stroke of the heating element 28 is restricted to have a maximum extension that terminates just before passage through the inner surface of the pipes defining the bore. This functions successfully however leaves a small fissure extending circumferentially around the inner surface of the weld zone. In FIG. 7*b* images 5-8 show action of a heating element with a projection 28 where the projection 66 warms a small area of inner face of the pipe, weakening it but only in a small measured area in front of the mainly now viscous and flowable material (image 5). Operation continues but viscous flowable weld material is now able to operate as exudate and to "just" bridge inner face as a result of internal pressure. Cooling continues the self-sealing (weld) of the inner face as projection moves on, creating a smooth inner surface with a weld through the entire weld zone.

Aspects of the present invention have been described by way of example only and it will be appreciated to the skilled addressee that modifications and variations may be made without departing form the scope of protection afforded by the appended claims.

The invention claimed is:

1. A pipe welding apparatus for welding first and second polymeric pipes in an end to end configuration around a circumferential weld zone defined by the end portions of the first and second pipes, the pipe welding apparatus comprising:
   one or more welding heads;
   a carriage for guiding the one or more welding heads around the circumferential weld zone;
   a drive arrangement for effecting relative rotation between the pipes and the or each welding head;
   wherein the or each of the welding heads comprises a body and a heating element carried by the body for supplying heat to the circumferential weld zone to cause melting of the circumferential weld zone, wherein the heating element is arranged to reciprocate relative to the body between a retracted and an extended configuration, such that as the heating element moves from the retracted to the extended configuration the heating element melts and penetrates the surface of the circumferential weld zone forming a weld;
   and further where the pipe welding apparatus is configured to perform a weld around the entire circumference of the weld zone with the heating element extending by a first distance to the extended configuration, and overweld a portion of the weld by performing one or more additional cycles of heat element reciprocation whereby the heating element extends to a second distance in the extended configuration which is less than the first distance.

2. The pipe welding apparatus according to claim 1, wherein the body further comprises a trailing contact surface trailing the heating element along the circumferential weld zone arranged to constrain molten polymeric material in the circumferential weld zone, where the heating element is also arranged to reciprocate relative to the trailing contact surface.

3. The pipe welding apparatus according to claim 1, wherein the drive arrangement is arranged to drive the or each heating element circumferentially around the circumferential weld zone.

4. The pipe welding apparatus according to claim 1, wherein drive arrangement is arranged to drive the carriage circumferentially around the polymeric pipes.

5. The pipe welding apparatus according to claim 1, where the carriage extends to form a loop for extending around the circumference of the polymeric pipes to be welded.

6. The pipe welding apparatus according to claim 1, further comprising a controller for controlling one or more operational parameters of the apparatus.

7. The pipe welding apparatus according to claim 6, wherein the operational parameters comprise one or more of the temperature of the heating element, the depth of penetration of the heating element into the weld zone, the speed of movement of the heating element, the speed of relative rotation between the pipes and the heating element(s), the angular orientation of the heating element relative to the body and/or the lateral alignment of the one or more welding heads relative to the weld zone.

8. The pipe welding apparatus according to claim 1, further comprising a measurement device for measurement of a characteristic of the circumferential weld zone.

9. The pipe welding apparatus according to claim 6, wherein the controller is arranged to control the one or more operational parameters dependent upon the measured characteristic.

10. The pipe welding apparatus according to claim 8 wherein the measurement device is carried by the carriage.

11. The pipe welding apparatus according to claim 8, wherein the measurement device comprises one or more ultrasonic transducers.

12. The pipe welding apparatus according to claim 8, wherein the measurement device is arranged to measure a characteristic of the weld zone before welding and the heating element and controls an operational parameter dependent upon the measured characteristic.

13. The pipe welding apparatus according to claim 1, wherein the one or more welding heads comprises a first and second welding head, where the first and second welding heads are positioned at substantially diametrically opposite locations of the carriage.

14. The pipe welding apparatus according to claim 1, wherein the orientation of the heating element relative to the body is adjustable.

15. The pipe welding apparatus according to claim 1, further comprising a capping arrangement for depositing a capping material onto the weld.

16. A method of welding first and second polymeric pipes in an end to end configuration around a circumferential weld zone, the method comprising guiding one or more weld heads around the circumferential weld zone, the or each welding head comprising a body and a heating element carried by the body for supplying heat to the circumferential weld zone to cause melting of the weld zone, and reciprocating the heating element such that as the heating element moves from the retracted to the extended configuration the heating element melts and penetrates the surface of the circumferential weld zone forming a weld, the method performing a weld around the entire circumference of the weld zone with the heating element extending by a first distance to the extended configuration, and overwelding a portion of the weld by performing one or more additional cycles of heat element reciprocation whereby the heating element extends to a second distance in the extended configuration which is less than the first distance.

17. A pipe welding apparatus according to claim 1, wherein the heating element comprises a proximal end for cooperating with a body of a welding head extending forwardly to a distal end, the distal end having a first end face defining a first penetrating surface and the heating element further comprising a projection extending longitudinally forwards from the first end face to a second end face defining a second penetrating surface.

* * * * *